United States Patent [19]

Hayashi et al.

[11] Patent Number: 5,250,140
[45] Date of Patent: Oct. 5, 1993

[54] DEVICE HAVING RAISED SIDE EDGE PORTIONS FOR HEAT-SEALING TUBULAR PACKAGING MATERIAL

[75] Inventors: Kojiro Hayashi; Fumiyuki Iwano, both of Tokushima; Yoichi Nishiguchi, Tokyo; Hisao Takahashi, Tokyo; Masaaki Ogawa, Tokyo; Yoshio Kobashi, Tokyo, all of Japan

[73] Assignee: Shikoku Kakoki Co., Ltd., Itano, Japan

[21] Appl. No.: 777,707

[22] Filed: Oct. 18, 1991

[30] Foreign Application Priority Data

Oct. 19, 1990 [JP] Japan .................................. 2-282983

[51] Int. Cl.$^5$ .............................................. B32B 31/24
[52] U.S. Cl. .................................. 156/380.5; 156/380.8
[58] Field of Search ............... 156/379.6, 379.8, 380.1, 156/380.2, 380.3, 380.4, 380.5, 380.6, 380.7, 380.8; 53/DIG. 2; 493/193, 201, 209

[56] References Cited

U.S. PATENT DOCUMENTS

| | | | |
|---|---|---|---|
| 2,941,575 | 6/1960 | Malmberg | 156/380.6 X |
| 3,632,943 | 1/1972 | Engler et al. | 156/380.6 X |
| 4,371,768 | 2/1983 | Pozna | 156/379.6 X |
| 4,704,509 | 11/1987 | Hilmersson | 156/380.2 X |

FOREIGN PATENT DOCUMENTS

| | | |
|---|---|---|
| 55-3215 | 1/1980 | Japan. |
| 58-134744 | 8/1983 | Japan. |
| 62-052025 | 3/1987 | Japan. |

Primary Examiner—Michael W. Ball
Assistant Examiner—Chester T. Barry
Attorney, Agent, or Firm—Armstrong, Westerman, Hattori, McLeland & Naughton

[57] ABSTRACT

A heat sealing device for a tubular packaging material which is made of a heat-sealable paper-base laminate having an aluminum foil layer and which is to be cut transversely thereof into lengths comprises a U-shaped high-frequency coil provided in a pressing surface of one of a pair of press members and having two straight portions extending in parallel to each other for heating the packaging material at opposite sides of each cutting portion therealong. Two strip-like magnetic members are arranged on the outer side of the respective straight portions and extend approximately over the entire length of the straight portions. Each of the two straight portions has a ridge extending longitudinally of the straight portion at each of two portions of the entire length thereof for individually applying an increased pressure to opposite side edge portions of the material. The ridge has a circular-arc contour in cross section.

5 Claims, 6 Drawing Sheets

DEVICE HAVING RAISED SIDE EDGE PORTIONS FOR HEAT-SEALING TUBULAR PACKAGING MATERIAL

BACKGROUND OF THE INVENTION

The present invention relates to a device for heat-sealing a tubular packaging material filled with a liquid beverage or like contents transversely thereof at a lengthwise spacing corresponding to a single container.

Heat sealing devices are already known for use with a tubular packaging material which is made of a heat-sealable paper-base laminate having an aluminum foil layer and which is to be cut transversely thereof into lengths. The device comprises a U-shaped high-frequency coil provided in a pressing surface of one of a pair of press members and having two straight portions extending in parallel to each other for heating the material at opposite sides of and along each of the portions thereof to be cut.

To effectively utilize the lines of magnetic force generated by the high-frequency coil by concentrating the lines on the inner side of the two straight coil portions, an arrangement is also known which has a magnetic member disposed over the entire inner side of each straight portion or locally on the inner side thereof (Examined Japanese Patent Publication No. 3215/1975 and Unexamined Japanese Patent Publication No. 52025/1987).

Another device of the type described is also known wherein each of the two straight coil portions is provided with a horizontal ridge extending approximately over the entire length thereof for excluding extraneous matter (Unexamined Japanese Patent Publication No. 134744/1983).

The device wherein the magnetic member is provided has the following problem. With reference to FIG. 10, beads 52 of molten resin are produced in an undulating form at a seal portion 51 of a tubular packaging material T along the edge thereof inside the container to be formed. If the container having such beads 52 is subjected to an external force, a crack will develop from the crest portion 53 of the bead 52 to break the container. Formation of such beads 52 are thought attributable to the following cause. Although the magnetic member disposed on the inner side of each of two straight portions serves to effectively utilize lines of magnetic force, the member fails to prevent lines of magnetic force from spreading outward from the straight portion, consequently permitting the material T to be heated to an unnecessary temperature at the portion thereof outside the straight portion.

With the device having the horizontal ridge, the ridge presses the seal portion with an increased pressure over the entire length thereof but is unable to press the seal portion uniformly over the entire length because the seal portion of the tube is not uniform in the thickness of the packaging material over the entire length. The tube has a seam at its center portion and a joint of the front and rear sides of the tube at each edge thereof. Especially, the seam of the tube is a lap having three times the thickness of the packaging material and has a larger thickness than the other portion, with the result that the seam is pressed under a greater pressure than is needed, permitting the paper layer of the packaging material to crack at this portion.

SUMMARY OF THE INVENTION

The main object of the present invention is to provide a device free of the foregoing problems for heat-sealing a tubular packaging material.

The present invention provides a device for heat-sealing a tubular packaging material which comprises a pair of press members, a U-shaped high-frequency coil provided in a pressing surface of one of the press members and having two straight portions extending in parallel to each other for heating the material at opposite sides of and along each of the portions thereof to be cut, and two striplike magnetic members arranged on the outer side of the respective straight portions and extending approximately over the entire length of the straight portions.

Each of the two straight portions has a ridge extending longitudinally thereof at each of two portions of the entire length thereof for individually applying an increased pressure to opposite side edge portions of the tubular material.

The ridge has a circular-arc contour in cross section.

The heat sealing device of the present invention has two striplike magnetic members arranged on the outer side of the respective straight portions and extending approximately over the entire length of the straight portions, so that the lines of magnetic force produced by the two straight portions, even if acting to spread outward from the straight portions, are deflected inward by the magnetic members. This obviates the likelihood the packaging material will be heated to a temperature higher than is needed at the portion thereof outside the coil, i.e., at the edge of each seal portion inside the container to be formed.

Furthermore, each of the two straight portions has a ridge extending longitudinally of the straight portion at each of two portions of the entire length thereof for individually applying an increased pressure to opposite side edge portions of the tubular material. The ridges thus provided properly seal the tube at its side edge portions which are prone to faulty sealing while rendering the tube center portion free of the likelihood that the paper layer of the packaging material will break.

Furthermore, the ridges have a circular-arc contour in cross section, so that the tube portions to which increased pressure is locally applied, i.e., opposite side edge portions of the tube, are made free of the likelihood that the paper layer of the packaging material will break.

DESCRIPTION OF THE PREFERRED EMBODIMENT

An embodiment of the present invention will be described below with reference to the drawings.

Figure 4:
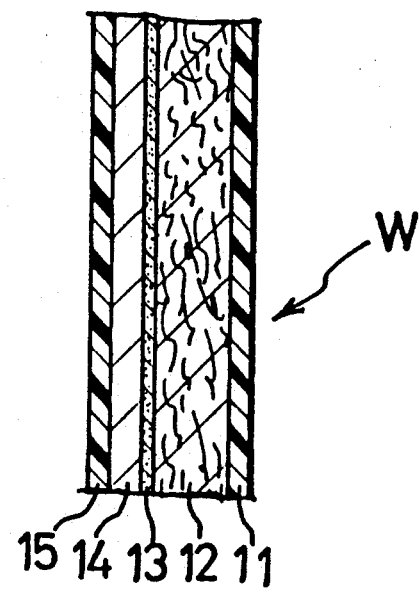
FIG. 4 is a sectional view of a web of packaging material.

A tubular packaging material T is prepared from a web W by lapping the inner surface of one edge portion of the web over the outer surface of the other edge portion thereof and heat-sealing the lap. As seen in FIG. 4, the web W is a laminate comprising an outer polyethylene layer 11, paper layer 12, adhesive layer 13, aluminum foil layer 14 and inner polyethylene layer 15 which are arranged in this order from the outer side of the container to be formed inward and joined together.

Figure 5:
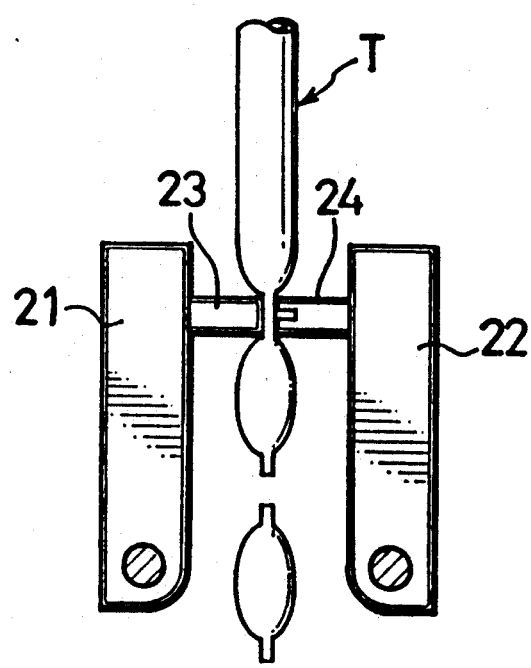
FIG. 5 is a diagram schematically showing the device in its entirety.

FIG. 5 shows a heat sealing device comprising a pair of press members 23, 24 opposed to each other and fixed to upper portions of a pair of pivotal arms 21, 22, respectively.

Although not shown, one of the press members, 23, has a cutter for cutting the tube T simultaneously with sealing. Since this press member 23 has no important relation with the present invention, the other press member 24 only will be described below.

Figure 1:
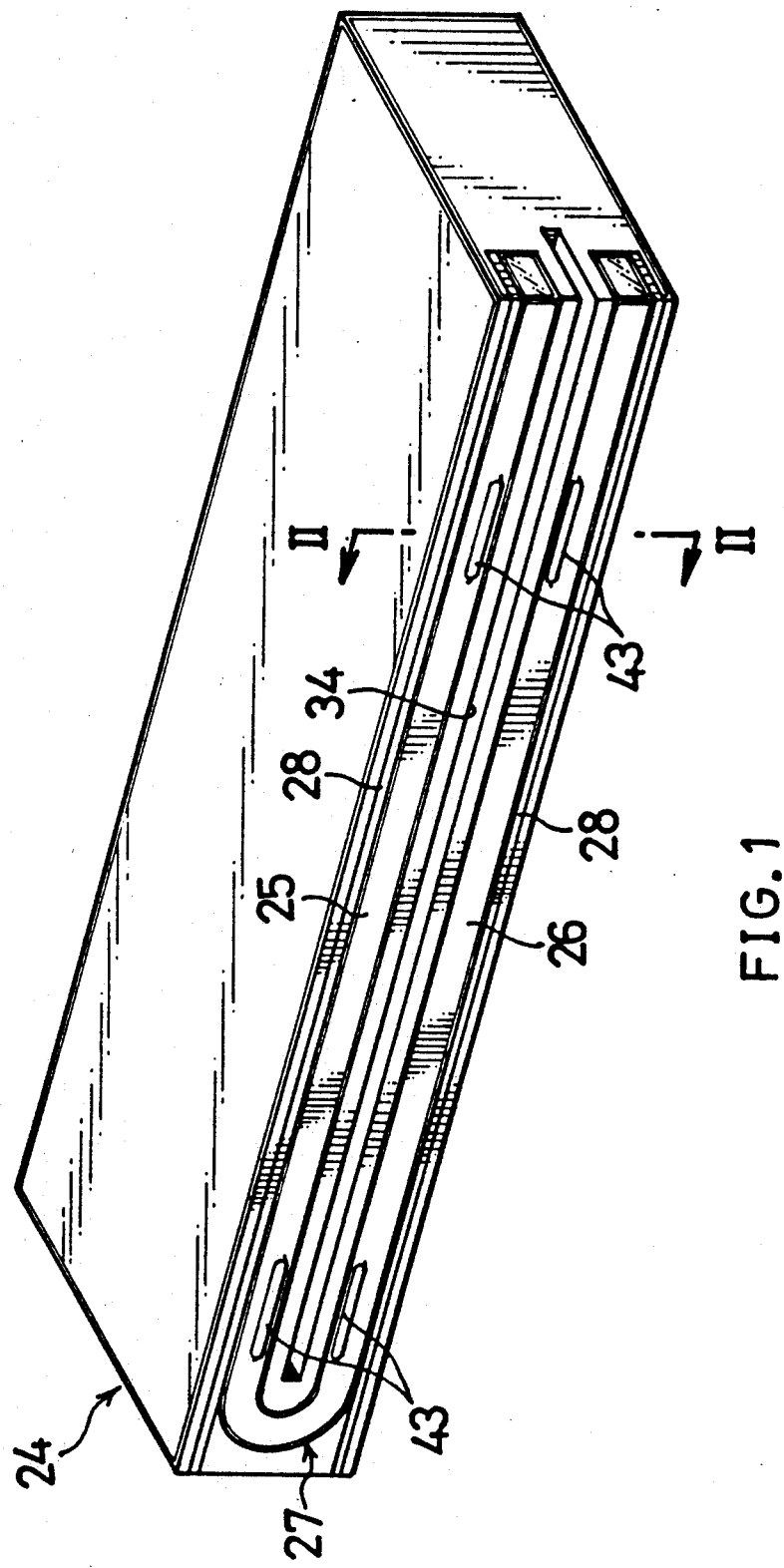
FIG. 1 is a perspective view showing one of press members of a device embodying the invention.

The other press member 24 is made almost entirely of an electrically insulating material such as epoxy resin. As seen in FIG. 1, the press member 24 is provided with a U-shaped high-frequency coil 27 made of copper and having two straight portions 25, 26 extending in parallel to each other, and two magnetic members 28 made of ferrite and each in the form of a strip or plate.

The press member 24 has a pressing surface 31 which is formed with a coil inserting U-shaped groove 32 in the middle of its height and two straight grooves 33 having open opposite ends for inserting therein the respective magnetic members 28 in contact with the outer side of the two straight portions 25, 26 in the groove 32. A cutter inserting straight groove 34 is also formed in the pressing surface 31 inside the U-shaped groove.

Figure 2:
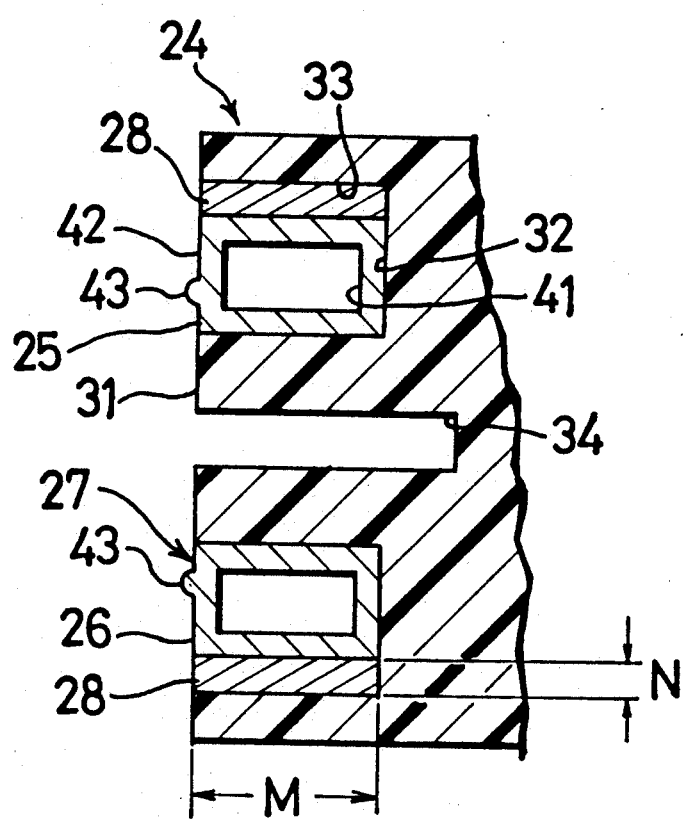
FIG. 2 is an enlarged view in section taken along the line II—II in FIG. 1.

As shown in greater detail in FIG. 2, the high-frequency coil 27 is in the form of a tube having a rectangular cross section and a cooling water channel 41 inside thereof. The coil has a planar side surface serving as a pressing surface 42 and is inserted in the groove 32 with the surface 42 flush with the pressing surface 31 of the press member 24. The high-frequency coil 27 has four ridges 43 formed on its pressing surface 42. As seen in FIG. 1, two ridges 43 are arranged respectively at two portions close to opposite ends of each of the two straight portions 25, 26 of the coil 27. When sealing the tube T, these ridges 43 apply an increased pressure to the respective side edge portions of the tube as seen in FIG. 6.

Figure 3:
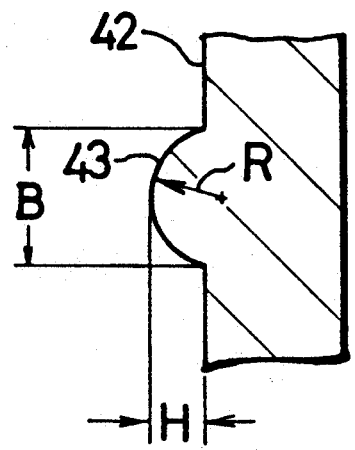
FIG. 3 is a cross sectional view showing a ridge in greater detail.
Figure 6:
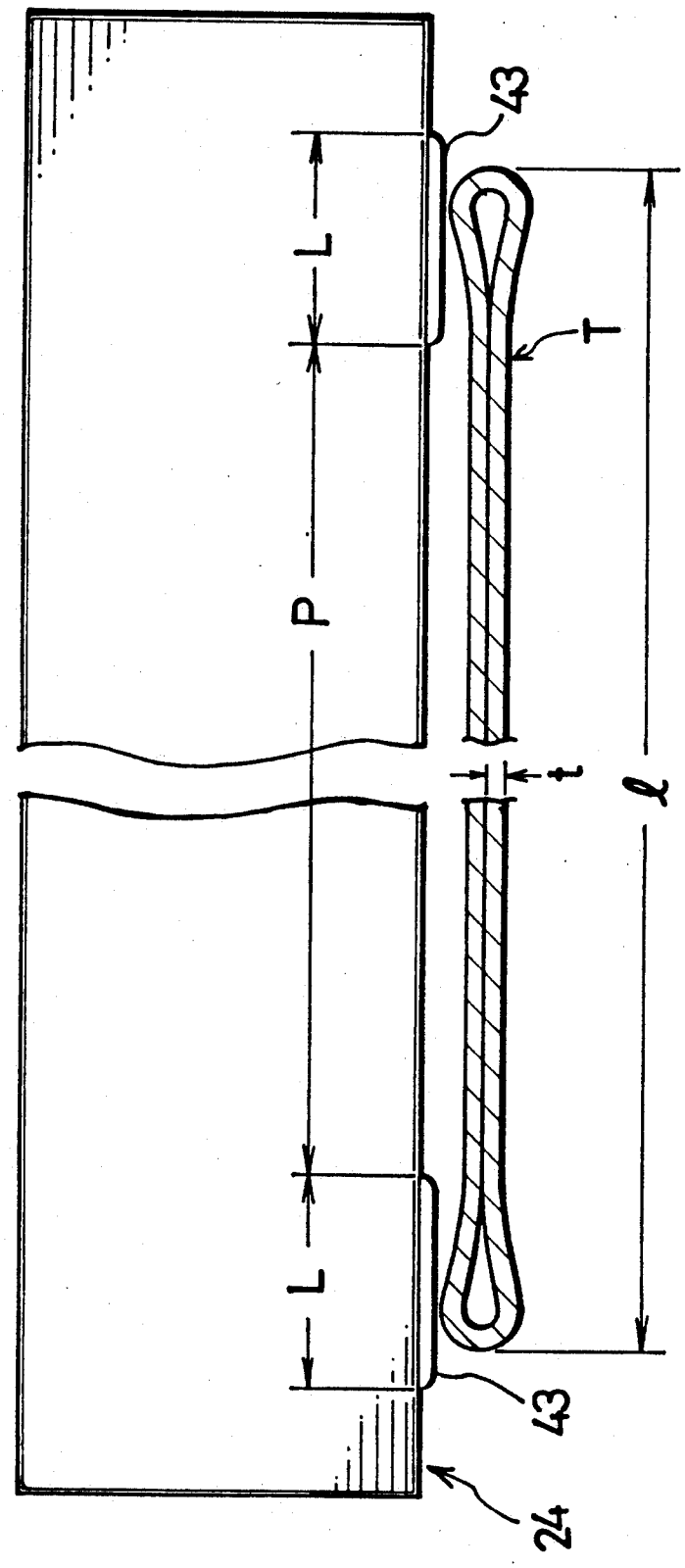
FIG. 6 is a diagram showing a tubular packaging material as positioned in relation with the ridges on a coil.

With reference to FIG. 6, the size of the ridges 43 will be described numerically as an example. When the tube T in a flat form is 102 mm in width l and 0.4 mm in the thickness t of the packaging material, the length L of the ridges 43 is 10 mm, and the distance P between the adjacent ridges 43 is 88 mm. Further with reference to FIG. 3, the ridges 43 are 0.6 mm in width B and 0.2 mm in height H. The ridges 43 have a circular-arc contour in cross section. The radius R of the circular arc is 0.325 mm.

The ridges 43 are not limited to the above specific example. The length L and the thickness t are variable in the ranges of 6 mm $\leq$ L $\leq$ 12 mm and 0.2 mm $\leq$ t $\leq$ 0.5 mm, respectively. Relative to the thickness t of the packaging material, the width B and the height H are variable over the ranges of $0.8t \leq B \leq 2t$ and $0.02t \leq H \leq 0.08t$, respectively.

Each of the magnetic members 28 is rectangular in cross section and has a width M equal to the depthwise dimension of the coil 27 and a thickness N about one-fifth of the width M as seen in FIG. 2.

Figure 7:
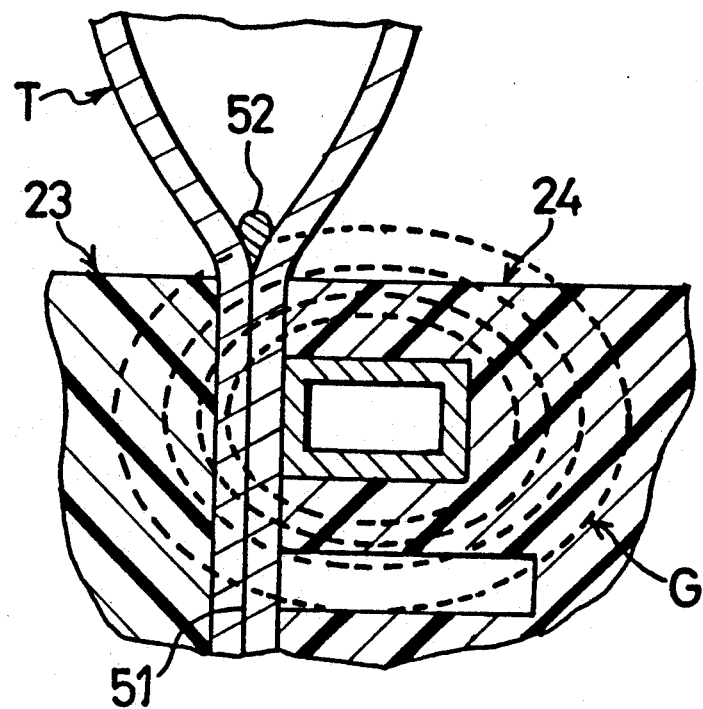
FIGS. 7 and 8 are diagrams for illustrating the operation of a magnetic member.
Figure 8:
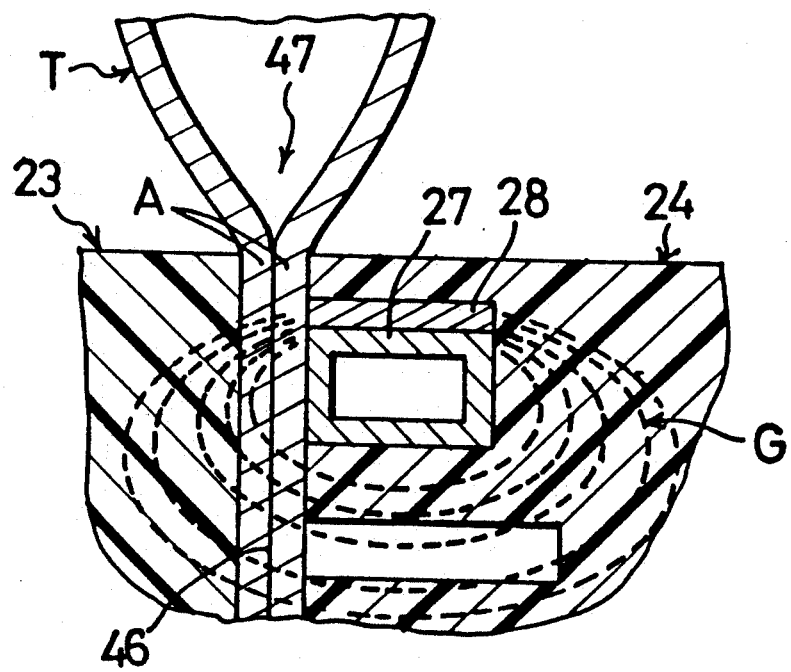
Figure 9:
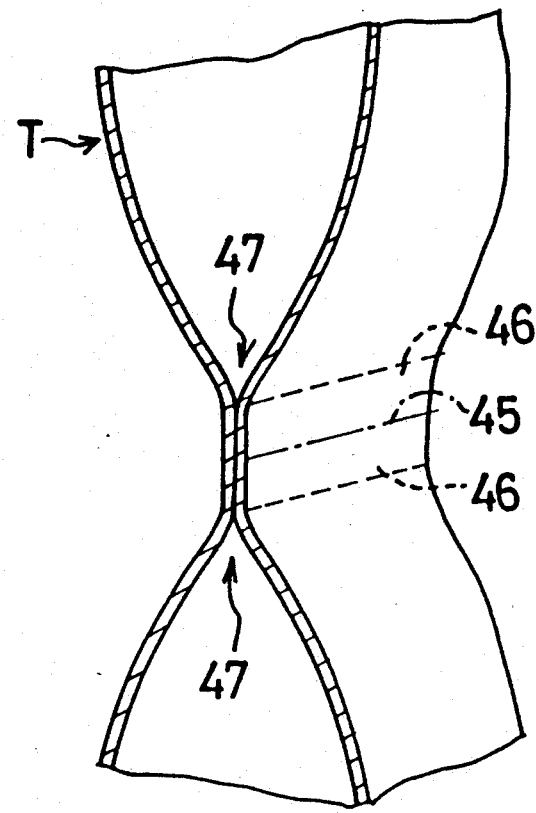
FIG. 9 is a perspective view partly broken away and showing the packaging material as sealed by the device of the invention.
Figure 10:
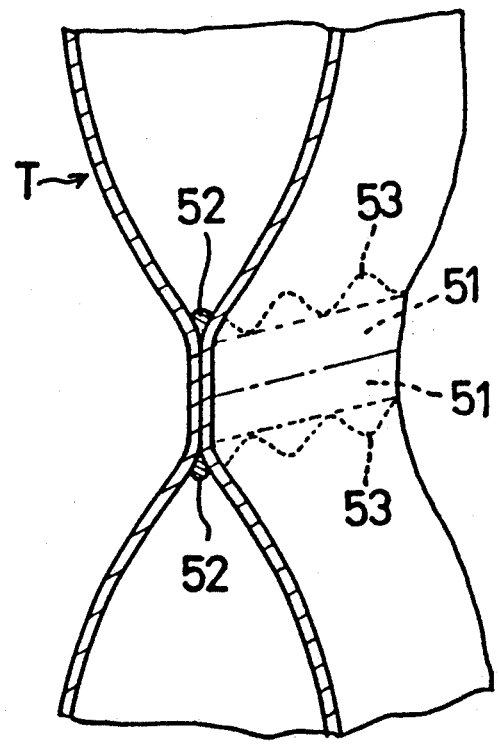
FIG. 10 is a perspective view partly broken away and showing the packaging material as sealed by a conventional device.

The operation of the magnetic member 28 will be described next with reference to FIGS. 7 and 8. In the absence of the magnetic member 28 as seen in FIG. 7, the lines of magnetic force, G, generated by the coil 27 spread outward from the coil 27, resembling smoothly curved superposed ellipses. However, when the magnetic member 28 is present on the outer side of the coil 27 as shown in FIG. 8, the lines of magnetic force, G, acting to spread to the outside of the coil 27 are deflected inward and no longer spread outward from the magnetic member 28. Consequently, the portion of the packaging material positioned outwardly of the coil 27 and indicated by an arrow A in FIG. 8 is less likely to be heated. When seal portions 46 are formed by sealing on opposite sides of the portion 45 to be cut as seen in FIG. 9, no beads of excessive molten polyethylene are formed along the edge 47 of each seal portion 46 inside the container to be formed.

What is claimed is:

1. A device for heat-sealing a tubular packaging material at opposite sides of and along each of cutting portions thereof before the material is cut transversely thereof into lengths each corresponding to a single container, the packaging material being made of a heat-sealable paper-base laminate having an aluminum foil layer, the heat-sealing device comprising:
   a pair of press members,
   a U-shaped high-frequency coil provided in a pressing surface of one of the press members and having two straight portions extending in parallel to each other for heating the packaging material at the respective sides of the cutting portion therealong, and
   two striplike magnetic members arranged on the outer side of the respective straight portions extending approximately over the entire length of the straight portions,
   each of the two straight portions of the coil having two separated discrete ridge portions each extending longitudinally on the straight portion for individually applying an increased pressure to opposite side edge portions of the tubular material.

2. A device as defined in claim 1 wherein the ridge has a circular-arc contour in cross section.

3. A device as defined in claim 1 wherein the length of the ridge is between 6 mm and 12 mm, inclusive.

4. A device as defined in claim 1 wherein assuming that the thickness of the packaging material, the width of the ridge and the height of the ridge are t, B and H, respectively, $$0.2 \text{ mm} \leq t \leq 0.5 \text{ mm},$$

$$0.8t \leq B \leq 2t, \text{ and}$$

$$0.02t \leq H \leq 0.08t.$$

5. A device as defined in claim 1 wherein the packaging material is 0.4 mm in thickness, and the ridge is 10 mm in length, 0.6 mm in width and 0.2 mm in height.

* * * * *

UNITED STATES PATENT AND TRADEMARK OFFICE
CERTIFICATE OF CORRECTION

PATENT NO.  : 5,250,140
DATED       : October 5, 1993
INVENTOR(S) : HAYASHI et al.

It is certified that error appears in the above-indentified patent and that said Letters Patent is hereby corrected as shown below:

On the cover page, Item [73], please correct the assignee to show joint assignees as follows: --Shikoku Kakoki Co., Ltd., Itano, Japan; and Jujo Paper Co., Ltd., Tokyo, Japan--.

Signed and Sealed this

Thirty-first Day of October 1995

Attest:

BRUCE LEHMAN

Attesting Officer

Commissioner of Patents and Trademarks